(12) United States Patent
Sakakima

(10) Patent No.: US 11,557,081 B2
(45) Date of Patent: Jan. 17, 2023

(54) IMAGE PROCESSING APPARATUS, CONTROL METHOD FOR AN IMAGE PROCESSING APPARATUS, AND MEDIUM

(71) Applicant: CANON KABUSHIKI KAISHA, Tokyo (JP)

(72) Inventor: Eito Sakakima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/144,663

(22) Filed: Jan. 8, 2021

(65) Prior Publication Data
US 2021/0133944 A1    May 6, 2021

Related U.S. Application Data

(63) Continuation of application No. PCT/JP2019/026682, filed on Jul. 4, 2019.

(30) Foreign Application Priority Data

Jul. 13, 2018 (JP) .............................. JP2018-133471

(51) Int. Cl.
  *G06T 15/20* (2011.01)
  *G06T 7/536* (2017.01)
  (Continued)

(52) U.S. Cl.
  CPC .............. *G06T 15/205* (2013.01); *G06T 5/50* (2013.01); *G06T 7/536* (2017.01); *G06T 7/73* (2017.01); *G06T 7/97* (2017.01)

(58) Field of Classification Search
  CPC ......... G06T 15/205; G06T 5/50; G06T 7/536; G06T 7/73; G06T 7/97; G06T 15/04;
  (Continued)

(56) References Cited

U.S. PATENT DOCUMENTS 9,792,719 B2 * 10/2017 Hyllus .................. G06T 15/005
10,742,951 B2    8/2020 Sakakima
(Continued)

FOREIGN PATENT DOCUMENTS

JP      10-191396 A    7/1998
JP    2006-024141 A    1/2006
(Continued)

OTHER PUBLICATIONS

Seitz, Steven M., and Charles R. Dyer. "Photorealistic scene reconstruction by voxel coloring." International Journal of Computer Vision 35.2 (1999): 151-173. (Year: 1999).*
(Continued)

*Primary Examiner* — Geoffrey E Summers
(74) *Attorney, Agent, or Firm* — Carter, DeLuca & Farrell LLP

(57) ABSTRACT

A reduction in quality of a virtual viewpoint image is suppressed. An image processing apparatus specifies an image in which a specific position in a target object is not occluded by another object from among a plurality of images obtained by the plurality of imaging apparatuses based on a pixel value of the plurality of images; determines, based on the specified image, a value of a pixel corresponding to the specific position in the virtual viewpoint image to be generated based on the plurality of images; and generates the virtual viewpoint image including the target object based on the determined value of the pixel.

15 Claims, 15 Drawing Sheets

(51) Int. Cl.
*G06T 7/73* (2017.01)
*G06T 7/00* (2017.01)
*G06T 5/50* (2006.01)

(58) Field of Classification Search
CPC ....... G06T 15/20; G06T 17/00; H04N 13/111; H04N 17/117; H04N 13/172; H04N 13/178; H04N 7/18; H04N 13/243
See application file for complete search history.

(56) References Cited

U.S. PATENT DOCUMENTS

2015/0049915 A1* 2/2015 Ciurea .................... G06T 7/557
382/106
2018/0137611 A1* 5/2018 Kwon .................. G06T 3/0093

FOREIGN PATENT DOCUMENTS

| JP | 2009-116532 A | 5/2009 |
| JP | 2009-211335 A | 9/2009 |
| JP | 2012-128884 A | 7/2012 |
| JP | 2013-061850 A | 4/2013 |
| JP | 2015-045920 A | 3/2015 |

OTHER PUBLICATIONS

Zhou, Zhiliang, et al. "Enhanced reconstruction of partially occluded objects with occlusion removal in synthetic aperture integral imaging." Chinese Optics Letters 9.4 (2011): 041002. (Year: 2011).*
International Search Report issued in International Application No. PCT/JP2019/026682 dated Sep. 17, 2019, pp. 1-2.

* cited by examiner

0 : INVISIBLE
1 : VISIBLE

701

| CAMERA ID | VISIBILITY DETERMINATION | PIXEL VALUE | | |
|---|---|---|---|---|
| | | R | G | B |
| 605 | 1 | 125 | 30 | 20 |
| 606 | 1 | 132 | 39 | 19 |
| 607 | 1 | 232 | 210 | 198 |
| 608 | 1 | 129 | 34 | 28 |
| 609 | 0 | – | | |

FIG.7

MASK TYPE
0: NONEXISTENT
1: EXISTENT (GOAL FRAME)
2: EXISTENT (GOAL NET)

0: INVISIBLE
1: VISIBLE

1201

| CAMERA ID | VISIBILITY DETERMINATION | MASK INFORMATION | PIXEL VALUE | | |
|---|---|---|---|---|---|
| | | MASK TYPE | R | G | B |
| 1105 | 1 | 2 | 132 | 30 | 24 |
| 1106 | 1 | 2 | 132 | 39 | 19 |
| 1107 | 1 | 2 | 232 | 210 | 198 |
| 1108 | 1 | 1 | - | - | - |
| 1109 | 0 | - | - | - | - |

FIG.12

MASK TYPE
0: NONEXISTENT
1: EXISTENT (GOAL FRAME)
2: EXISTENT (GOAL NET)

VISIBILITY DETERMINATION
0: INVISIBLE
1: VISIBLE

1501

| CAMERA ID | VISIBILITY DETERMINATION | MASK INFORMATION | | PIXEL VALUE | | |
|---|---|---|---|---|---|---|
| | | MASK TYPE | MASK COLOR INFORMATION (R,G,B) | R | G | B |
| 1105 | 1 | 2 | 224,224,224 | 132 | 30 | 24 |
| 1106 | 1 | 2 | 224,224,224 | 132 | 39 | 19 |
| 1107 | 1 | 2 | 224,224,224 | 232 | 210 | 198 |
| 1108 | 1 | 1 | 255,255,255 | – | – | – |
| 1109 | 0 | – | – | – | – | – |

FIG.15

IMAGE PROCESSING APPARATUS, CONTROL METHOD FOR AN IMAGE PROCESSING APPARATUS, AND MEDIUM

CROSS-REFERENCE TO RELATED APPLICATIONS

This application is a Continuation of International Patent Application No. PCT/JP2019/026682, filed Jul. 4, 2019, which claims the benefit of Japanese Patent Application No. 2018-133471, filed Jul. 13, 2018, both of which are hereby incorporated by reference herein in their entirety.

BACKGROUND

Field

The present disclosure relates to a technique to generate a virtual viewpoint image based on images acquired by performing image capturing using a plurality of cameras installed at different positions.

Background Art

In recent years, a technique has been attracting attention, which generates virtual viewpoint contents by using a multi-viewpoint image obtained by performing synchronous image capturing at multiple viewpoints by installing a plurality of cameras at positions different from one another. According to this technique, it is possible to view a highlight scene in soccer or basketball from a variety of angles, and therefore, it is possible to give a great feeling of being at a live performance to a user compared to a normal image.

It is possible to implement generation and browsing of virtual viewpoint contents by aggregating images captured by a plurality of cameras in an image generation apparatus, such as a server, generating a three-dimensional model in the image generation apparatus, performing processing, such as rendering, and transmitting the virtual viewpoint contents to a user terminal.

As a generation method of a three-dimensional model, which is performed in an image generation apparatus, a shape estimation method called visual hull is well known. A three-dimensional model generated by the visual hull or the like is represented by points or voxels in a space in which the model is formed. In order to cause the point or voxel to have color information, coloring processing for each point or voxel is performed by using images captured by a plurality of cameras. At the time of coloring the point or voxel by the coloring processing, it is known to select a camera that is used for coloring based on the positional relationship between a virtual viewpoint and the camera and perform the coloring processing by using the captured image of the selected camera.

Patent Document 1 has disclosed a method of generating a virtual viewpoint image by calculating a distance from a camera to an object and correcting beam information in accordance with the distance.

PATENT LITERATURE

Patent Document 1 Japanese Patent Laid-Open No. 2012-128884

SUMMARY

However, Patent Document 1 has not taken into consideration a possibility that occlusion may occur depending on the relational relationship between the camera actually used for image capturing and the object. Consequently, as a result of determining a pixel value of a virtual viewpoint image based on the captured image of the camera in which occlusion has occurred, there is a concern that the quality of the generated virtual viewpoint image is reduced.

Consequently, in view of the above-described problem, an object of the present disclosure is to suppress a reduction in quality of a virtual viewpoint image by determining a pixel value by using an image selected appropriately from among a plurality of images based on image capturing by a plurality of cameras.

The present disclosure is an image processing apparatus that includes: one or more memories configured to store instructions; and one or more processors configured to execute the instructions to: specify an image in which a specific position in a target object is not occluded by another object from among a plurality of images obtained by a plurality of imaging apparatuses based on a pixel value of the plurality of images; determine, based on the specified image, a value of a pixel corresponding to the specific position in a virtual viewpoint image to be generated based on the plurality of images; and a generation unit configured to generate the virtual viewpoint image including the target object based on the determined value of the pixel.

a selection unit configured to select an image in which a specific position in the target object is not shielded by another object from among a plurality of images based on image capturing by the plurality of cameras based on a pixel value of the image; a determination unit configured to determine a value of a pixel corresponding to the specific position in the virtual viewpoint image based on the image selected by the selection unit; and a generation unit configured to generate the virtual viewpoint image based on the value of the pixel determined by the determination unit.

Further features of the present disclosure will become apparent from the following explanation of embodiments given with reference to attached drawings.

BRIEF DESCRIPTION OF THE DRAWINGS

FIG. 7 is a list storing information on cameras used for image capturing in the first embodiment;

FIG. 12 is a list storing information on cameras used for image capturing in the second embodiment;

FIG. 15 is a list storing information on cameras used for image capturing in the third embodiment.

DESCRIPTION OF THE EMBODIMENTS

In the following, with reference to the drawings, embodiments of the present disclosure are explained in detail. However, the following embodiments are not intended to limit the present disclosure and all combinations of features explained in the following are not necessarily indispensable to the solution of the present disclosure. Explanation is given by attaching the same symbol to the same configuration. Further, the relative arrangement, the shapes and the like of the components described below are only exemplary and are not intended to limit the present disclosure only to those.

First Embodiment

In the present embodiment, at the time of performing coloring to a point configuring a three-dimensional model, after excluding a captured images having an outlier from the candidates of captured images used for coloring, selection of a captured image and coloring are performed.

<About Image Generation System>

Figure 1:
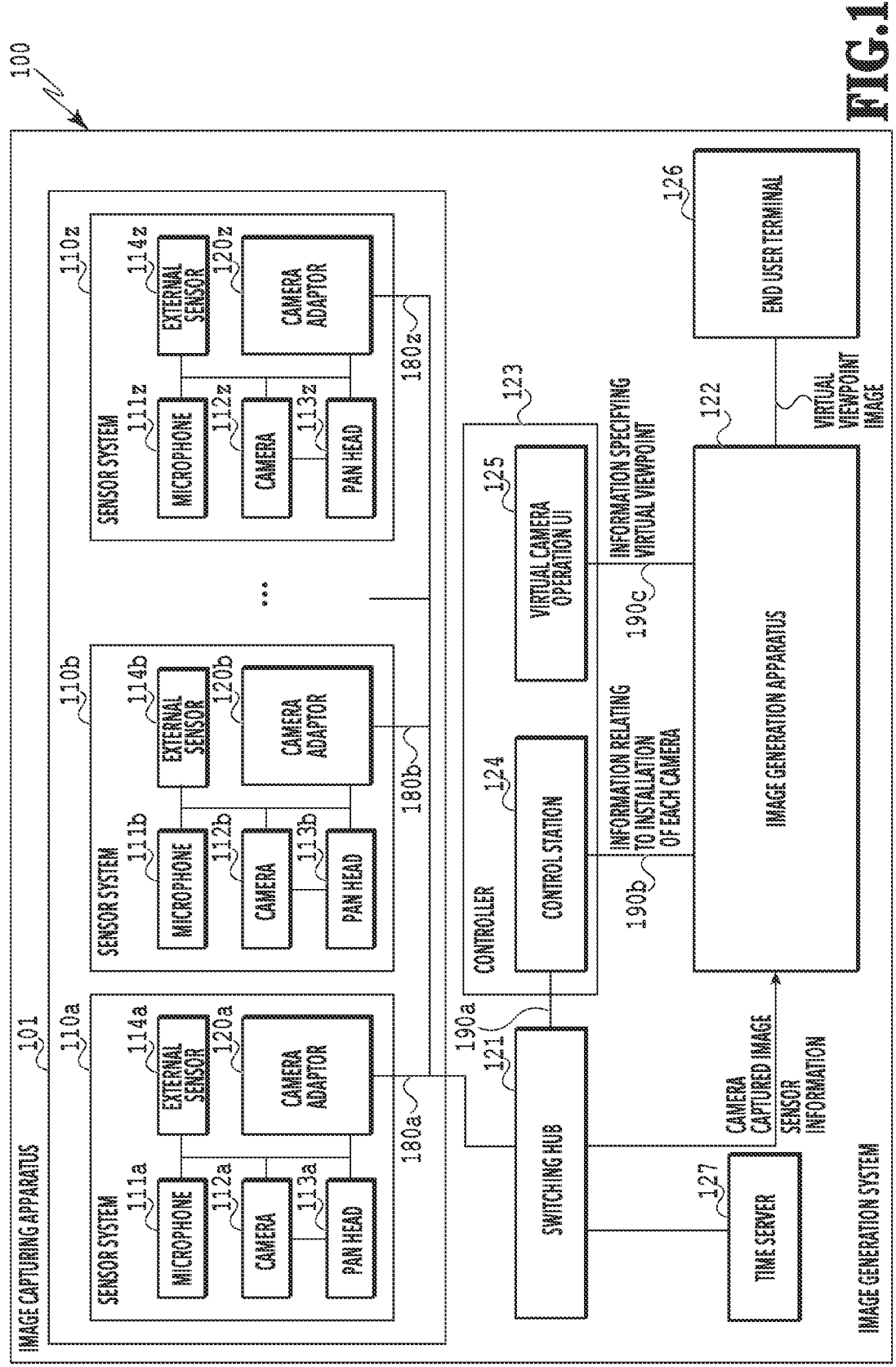
FIG. 1 is a block diagram showing an outline configuration of an image generation system in a first embodiment.

In the following, an image generation system in the present embodiment is explained by using FIG. 1. FIG. 1 is a diagram showing an outline configuration of a system that performs image capturing and collects sounds by installing a plurality of cameras (imaging apparatuses) and microphones in a game stadium, such as a baseball park and a soccer stadium, and a facility, such as a concert hall, and the like.

An image generation system 100 has a sensor system 110a to a sensor system 110z, a switching hub 121, an image generation apparatus 122, a controller 123, and an end user terminal 126. The set of the sensor systems is referred to as an image capturing apparatus group 101.

The controller 123 has a control station 124 and a virtual camera operation user interface 125. In the present specification, the user interface is abbreviated to UI. The control station 124 performs management control of the operating state, parameter setting control and the like for each block configuring the image generation system 100 through a network 180a to a network 180z and a network 190a to a network 190c. Here, it may be possible to adopt GbE (Gigabit Ethernet) or 10 GbE in conformity to the IEEE standard, which is Ethernet (registered trademark), as the network or it may also be possible to configure the network by combining the interconnect Infiniband, the industrial Ethernet and the like. Further, the network is not limited to these and may be another type of network.

First, the operation to transmit images and voices acquired by the 26 sets of the sensor systems, that is, the sensor system 110a to the sensor system 110z from each sensor system 100 the image generation apparatus 122 is explained. In the image generation system 100 in the present embodiment, each of the sensor system 110a to the sensor system 110z is connected with the image generation apparatus 122 via the switching hub 121.

In a case where there is no special explanation in the following, the 26 sets of the sensor system 110a to the sensor system 110z is described as a sensor system 110 without distinction. Similarly, the devices within each sensor system 110 are described as a microphone 111, a camera 112, a pan head 113, an external sensor 114, and a camera adaptor 120 in a case where there is no special explanation. Further, the number of sensor systems is described as 26, but this is only an example and the number of sensor systems is not limited to this. Furthermore, in the present embodiment, unless otherwise noted, explanation is given on the assumption that the concept of image includes the concept of both still image and moving image. Tat is, it is possible for the image generation system 100 of the present embodiment to process both the still image and the moving image. Further, in the present embodiment, an example is explained mainly in which images (so-called virtual viewpoint images) and voices (so-called virtual viewpoint voices) at a virtual viewpoint are included in virtual viewpoint contents provided by the image generation system 100, but the example is not limited to this. For example, voices may not be included in the virtual viewpoint contents. Further, for example, the voice included in the virtual viewpoint contents may be voice collected by the microphone closest to the virtual viewpoint. Furthermore, in the following, for simplification of explanation, description of voice is omitted partially, but basically, images and voices are processed together.

Each of the sensor system 110a to the sensor system 110z has one camera (camera 112a to camera 112z). That is, the image generation system 100 has a plurality of cameras for capturing the same image capturing-target area from a plurality of directions. Within the image generation system 100, a so-called star-type network is constructed in which each sensor system 110 is connected with the switching hub 121 and each sensor system 110 performs transmission and reception of data between each sensor system 110 and a central device via the switching hub 121.

The sensor system 110a has a microphone 111a, a camera 112a, a pan head 113a an external sensor 114a, and a camera adaptor 120a. The configuration of the sensor system is merely exemplary and the sensor system 110a is only required to have at least the one camera adaptor 120a and the one camera 112a or the one microphone 111a. Further, for example, it may also be possible to configure the sensor system 110a by the one camera adaptor 120a and a plurality of the cameras 112a or configure the sensor system 110a by the one camera 112a and a plurality of the camera adaptors 120a. That is, in the image generation system 100, the number of cameras 112 is N and the number of camera adaptors 120 is M (however, N and M are each an integer not less than 1). Further, the sensor system 110a may include a device other than the devices shown in FIG. 1. Furthermore, in the sensor system 110a, the camera 112a and the camera adaptor 120a may be configured by being integrated into the same casing. In that case, the microphone 111a may be built in the integrated camera 112a or may be connected to the outside of the camera 112a. The voice data collected by the microphone 111a and the image data captured by the camera 112a are transferred to the switching hub 121 via the camera adaptor 120a. Further, in the present specification, the image captured by the camera is described as "captured image".

The configuration of the sensor system 110b to the sensor system 110z is the same as that of the sensor system 110a, and therefore, explanation is omitted. However, the configuration of the sensor system 110b to the sensor system 110z is not limited to the same configuration as that of the sensor system 110a and each sensor system 110 may have a different configuration.

The image generation apparatus 122 performs processing to generate a virtual viewpoint image based on captured images acquired from the sensor system 110.

A time server 127 has a function to distribute time information and a synchronization signal and distributes time information and a synchronization signal to each sensor system 110 via the switching hub 121. The camera adaptors 120a to 120z having received time information and a synchronization signal genlock the cameras 112a to 112z based on the received time information and synchronization signal and perform image frame synchronization. That is, the time server 127 synchronizes the image capturing timing of the plurality of the cameras 112. Due to this, it is possible for the image generation system 100 to generate a virtual viewpoint image based on the plurality of images captured at the same timing, and therefore, it is possible to suppress a reduction in quality of the generated virtual viewpoint image, the reduction resulting from the deviation of the image capturing timing. In the present embodiment, the time server 127 manages the time synchronization of the plurality of the cameras 112, but this is not limited and it may also be possible for each camera 112 or each camera adaptor 120 to independently perform the processing for the time synchronization.

The virtual viewpoint image generated by the image generation apparatus 122 is transmitted to the end user terminal 126 and it is possible for a user who operates the end user terminal 126 to browse the image and listen to the voice in accordance with the specified viewpoint. Further, it may also be possible for the image generation apparatus 122 to transmit the virtual viewpoint image to the user end terminal 126 by using the MPEG-DASH protocol after compression-coding the virtual viewpoint image by the standard technique represented by H.264 or HEVC. Alternatively, it may also be possible for the image generation apparatus 122 to transmit the non-compressed virtual viewpoint image to the end user terminal 126. In particular, in the former case where the compression coding is performed, as the end user terminal 126, a smartphone, a tablet or the like is supposed and in the latter case, a display capable of displaying a non-compressed image is supposed. That is, in accordance with the type of the end user terminal 126, it is possible to switch the image formats. Further, the image transmission protocol is not limited to MPEG-DASH and for example, it may also be possible to use, for example, HLS (HTTP Live Streaming) and another transmission method.

The control station 124 transmits data of a three-dimensional model, such as a target stadium for which a virtual viewpoint image is generated to the image generation apparatus 122. Further, the control station 124 performs calibration at the time of installing the camera. Specifically, the control station 124 installs a marker on the image capturing-target field and by using the image captured by each camera 112, derives the position and the orientation in the world coordinates of each camera and the focal length. Information on the derived position, orientation, and focal length of each camera is transmitted to the image generation apparatus 122. The data of the three-dimensional model and the information on each camera transmitted to the image generation apparatus 122 are used at the time of the image generation apparatus 122 generating a virtual viewpoint image.

The virtual camera operation UI 125 transmits information specifying a virtual viewpoint for which an image is generated to the image generation apparatus 122. The image generation apparatus 122 generates an image corresponding to the specified virtual viewpoint and transmits the generated virtual viewpoint image to the end user terminal 126. The above is the contents of the virtual viewpoint image generation system in the present embodiment.

<About Configuration of Image Generation Apparatus>

In the following, the configuration of the image generation apparatus in the present embodiment is explained by using FIG. 2A and FIG. 2B. First, the software configuration of the image generation apparatus 122 is explained by using FIG. 2A.

A captured image input unit 201 is an input processing unit configured to input image data and voce data that are transmitted from the sensor system 110 via the switching hub 121. Data input to the captured image input unit 201 is transmitted to a three-dimensional model generation unit 203 and a captured image selection unit 208, both to be described later.

A communication control unit 202 is a processing unit configured to control communication between the image capturing apparatus group 101 and the image generation apparatus 122, and between the control station 124 and the image generation apparatus 122. The image generation apparatus 122 acquires the data (three-dimensional model data) indicating a three-dimensional shape of a stadium and the like and the information on the installation of each camera, both transmitted from the control station 124.

The three-dimensional model generation unit 203 generates data representing a three-dimensional shape of an object, that is, a three-dimensional model based on the data of the image captured by each of the plurality of cameras, which is transmitted from the captured image input unit 201. It is possible to generate a three-dimensional model by using, for example, a shape estimation method, such as the visual hull. In the present embodiment, explanation below is given on the assumption that a three-dimensional model is configured by a set of points. Further, a point configuring a three-dimensional model is described as "constituent point". Each constituent point corresponds to each different specific position on an object. The generation method of a three-dimensional model is not limited to the visual hull. Further, the format of a three-dimensional model is not limited and for example, a three-dimensional model may be represented by a set of voxels or may be represented by a polygon mesh.

A three-dimensional model coloring unit 204 performs coloring processing for the three-dimensional model generated by the three-dimensional model generation unit 203 by using the images captured by the plurality of cameras. In detail, the three-dimensional model coloring unit 204 performs coloring by selectively determining an image that is used from among the images captured by the plurality of cameras for each constituent point of the three-dimensional model and acquiring an appropriate pixel value from the determined image, and so on.

A virtual viewpoint image generation unit 205 performs processing to generate an image in a case where an object is viewed from a virtual viewpoint, that is, a virtual viewpoint image based on the generated three-dimensional model. For example, it is possible to generate a virtual viewpoint image by projecting a three-dimensional model arranged in a three-dimensional space onto a virtual viewpoint.

A video image output unit 206 performs processing to output video image data including data of the virtual viewpoint image generated by the virtual viewpoint image generation unit 205 to the end user terminal 126. Conversion processing of the video image format in accordance with the end user terminal 126 is performed by the video image output unit 206.

A virtual viewpoint information acquisition unit 207 acquires information indicating the virtual viewpoint specified via the virtual camera operation UI 125 and transmits the acquired information to the virtual viewpoint image generation unit 205 and the captured image selection unit 208, to be described later.

The captured image selection unit 208 performs processing to select an image that is used at the time of performing coloring to a three-dimensional model from among the images captured by the plurality of cameras. By using the image selected by the captured image selection unit 208, the three-dimensional model coloring unit 204 performs coloring processing. In the present embodiment, the image generation apparatus 122 acquires a plurality of captured images as the images based on the image capturing by the plurality of cameras and performs coloring processing based on the pixel value of the captured image selected therefrom. However, this is not limited and it may also be possible for the image generation apparatus 122 to acquire a foreground image or the like obtained by extracting an area of a predetermined object from a captured image as the image based on the image capturing. Then, it may also be possible for the image generation apparatus 122 to perform coloring processing based on the pixel value of the foreground image selected from among the plurality of foreground images based on the image capturing by the plurality of cameras. The configuration of the image generation apparatus 122 is not limited to the above. It may also be possible for part of the above-described components to be mounted on another apparatus separate from the image generation apparatus 122, for example, such as the three-dimensional model generation unit 203.

Figure 2:
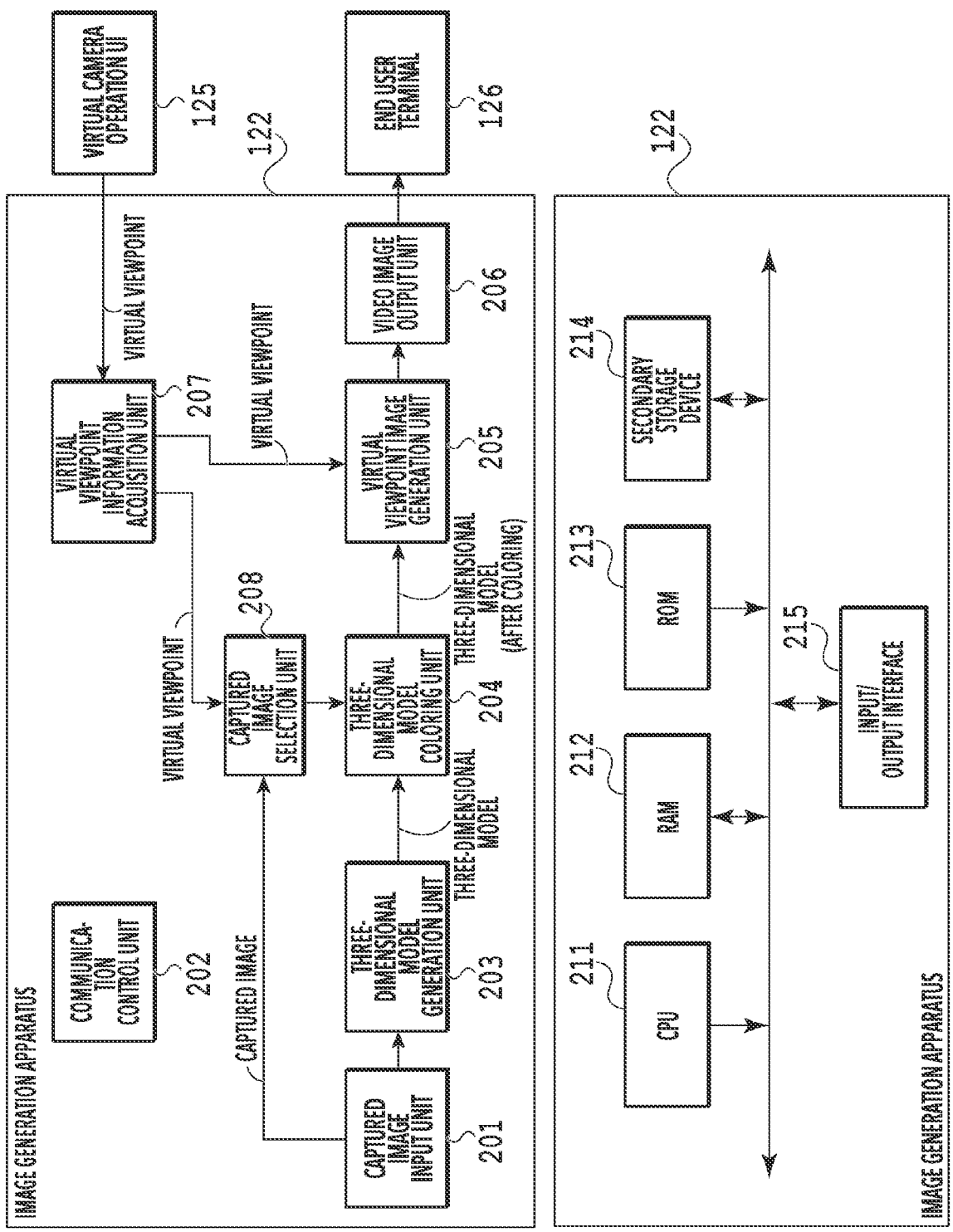
FIG. 2A and FIG. 2B are each a block diagram showing a configuration of an image generation apparatus in the first embodiment.

Following the above, the hardware configuration of the image generation apparatus 122 is explained by using FIG. 2B. FIG. 2B is a block diagram showing the hardware configuration of the image generation apparatus 122. The image generation apparatus 122 has a CPU 211, a RAM 212, a ROM 213, a secondary storage device 214, and an input/output interface 215. These components are connected by a bus and capable of performing transmission and reception of data between the components.

The CPU 211 executes programs stored in the ROM 213 by using the RAM 212 as a work memory and centralizedly controls each component of the image generation apparatus 122 via a system bus. Due to this, the modules shown in FIG. 2A are implemented and processing shown in FIG. 3 and FIG. 5, to be described later, is performed.

The secondary storage device 214 is a device in which various kinds of data handled in the image generation apparatus 122 is stored and for example, an HDD, an optical disk drive, a flash memory or the like is used as the secondary storage device 214. The CPU 211 writes data to the secondary storage device 214 and reads data stored in the secondary storage device 214 via the system bus. The input/output interface 215 performs transmission and reception of data between the image generation apparatus 122 and an external apparatus thereof. The above is the contents of the configuration of the image generation apparatus 122 in the present embodiment.

<About Processing to Generate Virtual Viewpoint Image>

Figure 3:
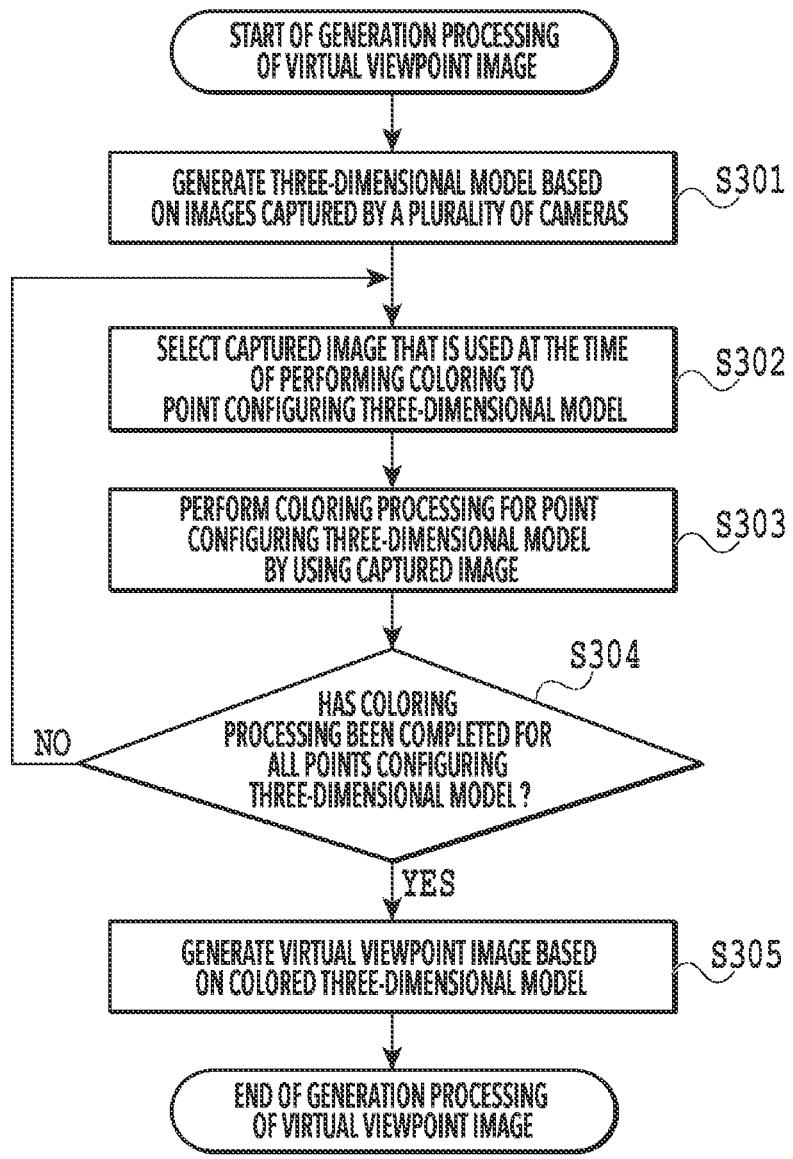
FIG. 3 is a flowchart of processing to generate a virtual viewpoint image in the first embodiment.

In the following, processing to generate a virtual viewpoint image in the present embodiment is explained by using FIG. 3. FIG. 3 is a flowchart showing a flow of the processing to generate one frame of a virtual viewpoint image.

At S301, the three-dimensional model generation unit 203 generates a three-dimensional model based on images captured by a plurality of cameras. In the following, "step S-" is simply abbreviated to "S-".

At S302, the captured image selection unit 208 selects an image that is used for coloring to the constituent point of the three-dimensional model from among the images captured by the plurality of cameras. Details of the processing performed at this step will be described later by using FIG. 5 and FIG. 6.

At S303, the three-dimensional model coloring unit 204 performs coloring processing for the constituent point of the three-dimensional model by using the image selected at S302.

At S304, the three-dimensional model coloring unit 204 determines whether the coloring processing has been performed for all the constituent points of the three-dimensional model. In a case where the determination results at S304 are affirmative, the processing advances to S305. On the other hand, in a case where the determination results at S304 are negative, the processing returns to S302 and the coloring processing is performed for the unprocessed constituent point(s).

At S305, the virtual viewpoint image generation unit 205 generates a virtual viewpoint image based on the three-dimensional model for which the coloring processing has been performed. The above is the contents of the processing to generate a virtual viewpoint image in the present embodiment.

In the present embodiment, a case is explained mainly where a virtual viewpoint image is generated by performing rendering after the image generation apparatus 122 performs the coloring processing for each component (each point) of the three-dimensional model generated based on the captured images. In this case, the value of each pixel of the virtual viewpoint image is determined based on the color of the component of the colored three-dimensional model and the virtual viewpoint. However, the generation method of a virtual viewpoint image (determination method of a pixel value) is not limited to this. For example, it may also be possible for the image generation apparatus 122 to determine to which component of the three-dimensional model each pixel of the virtual viewpoint image to be generated corresponds and determine the pixel value of the virtual viewpoint image based on the pixel value corresponding to the component in the selected captured image without performing coloring directly to the three-dimensional model.

<About Coloring Image Selection Processing>

In the following, processing to select a captured image that is used for coloring to a constituent point of a three-dimensional model (referred to as coloring image selection processing) from among captured images acquired by capturing the same image capturing-target area by using a plurality of cameras installed at positions different from one another is explained. The coloring image selection processing is performed at S302 in FIG. 3.

Figure 4A:
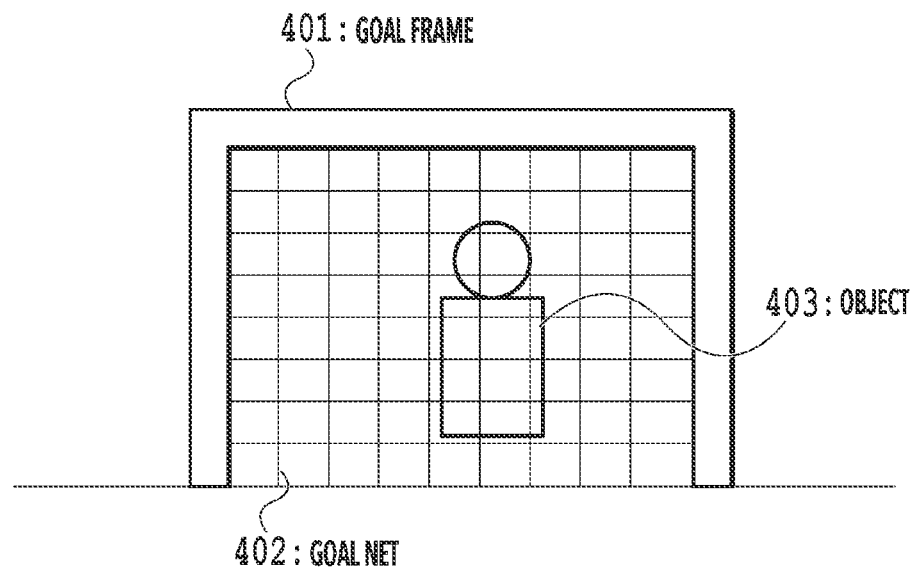
FIG. 4A and FIG. 4B are each a schematic diagram explaining an outline of coloring image selection processing in the first embodiment.
Figure 4B:
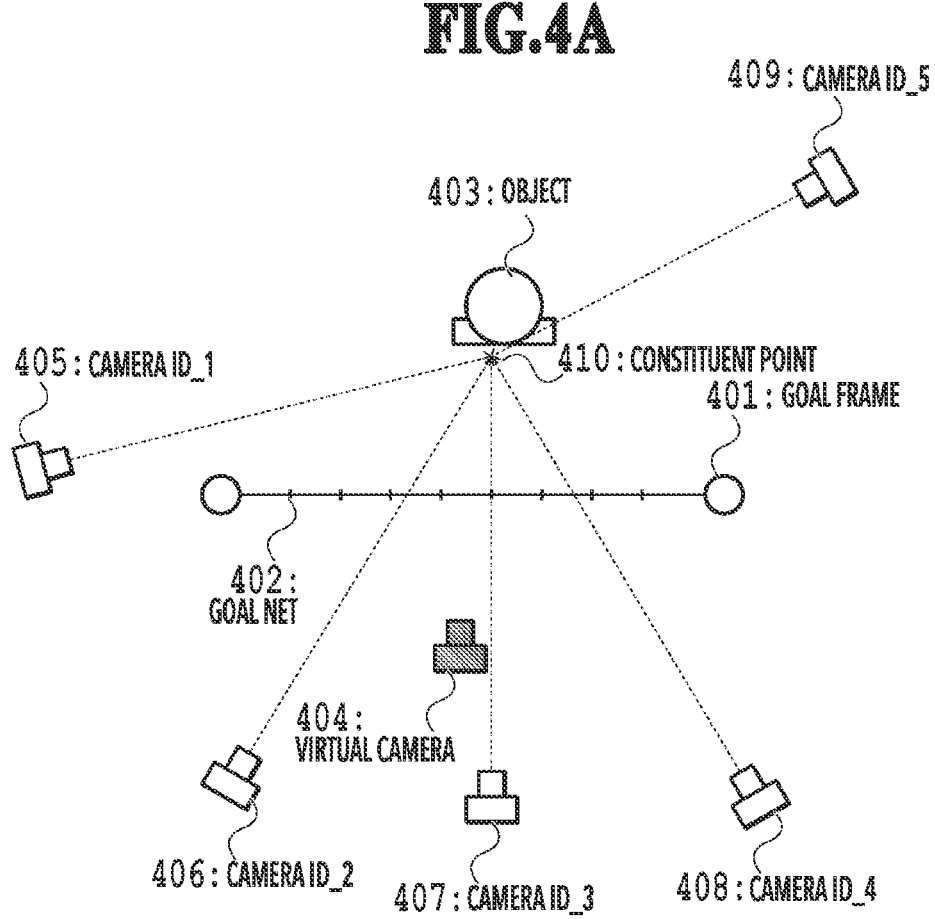

First, an outline of the coloring image selection processing is explained by using FIG. 4A and FIG. 4B with a case being taken as an example where a virtual viewpoint image in accordance with a virtual viewpoint in the direction in which the field is viewed from behind a goal net in a soccer stadium is generated.

FIG. 4A is an example of a virtual viewpoint image that is generated in the present embodiment and a diagram showing an image viewed from behind a goal net. FIG. 4B is a diagram in which the situation in FIG. 4A is observed from above for explaining a positional relationship among a goal net, a goal frame, and a virtual camera indicating a virtual viewpoint. In FIG. 4A and FIG. 4B, symbol 401 indicates a goal frame and symbol 402 indicates a goal net. For the sake of explanation, FIG. 4B is a diagram in which the portion of the crossbar of the goal frame 401 is omitted. Symbol 403 indicates an image capturing-target object and in this case, a player (specifically, goal keeper). Symbol 404 indicates a virtual camera and a virtual viewpoint image is generated for the viewpoint from this virtual camera. Symbols 405 to 409 indicate cameras that capture images necessary for generating a virtual viewpoint image.

The problem of the present embodiment can be explained by FIG. 4A and FIG. 4B. FIG. 4A shows an image captured by the virtual camera 404 set behind the goal net 402, that is, a virtual viewpoint image. Conventionally, in a case where the virtual viewpoint image such as this is generated, in coloring to each point configuring the three-dimensional model representing the object, a camera whose orientation toward the object is similar to that of the virtual camera is selected. For example, in the case of FIG. 4B, the camera 407 whose orientation is similar to that of the virtual camera 404 is selected and coloring is performed by using the image captured by the camera 407. At this time, in the image captured by the camera 407, the goal net 402 is captured and in a case where coloring is performed in this state, there is such a problem that the three-dimensional model representing the object 403 is colored in the color of the goal net 402.

Consequently, in the present embodiment, for example, in a case where coloring is performed to a constituent point 410, in place of the camera 407, a camera for which the goal net 402 does not exist on a line connecting the camera and the constituent point 410 (in FIG. 4B, camera 406, camera 408 and the like are candidates) is selected. Due to this, it is made possible to perform appropriate coloring processing for the constituent point 410.

Figure 5:
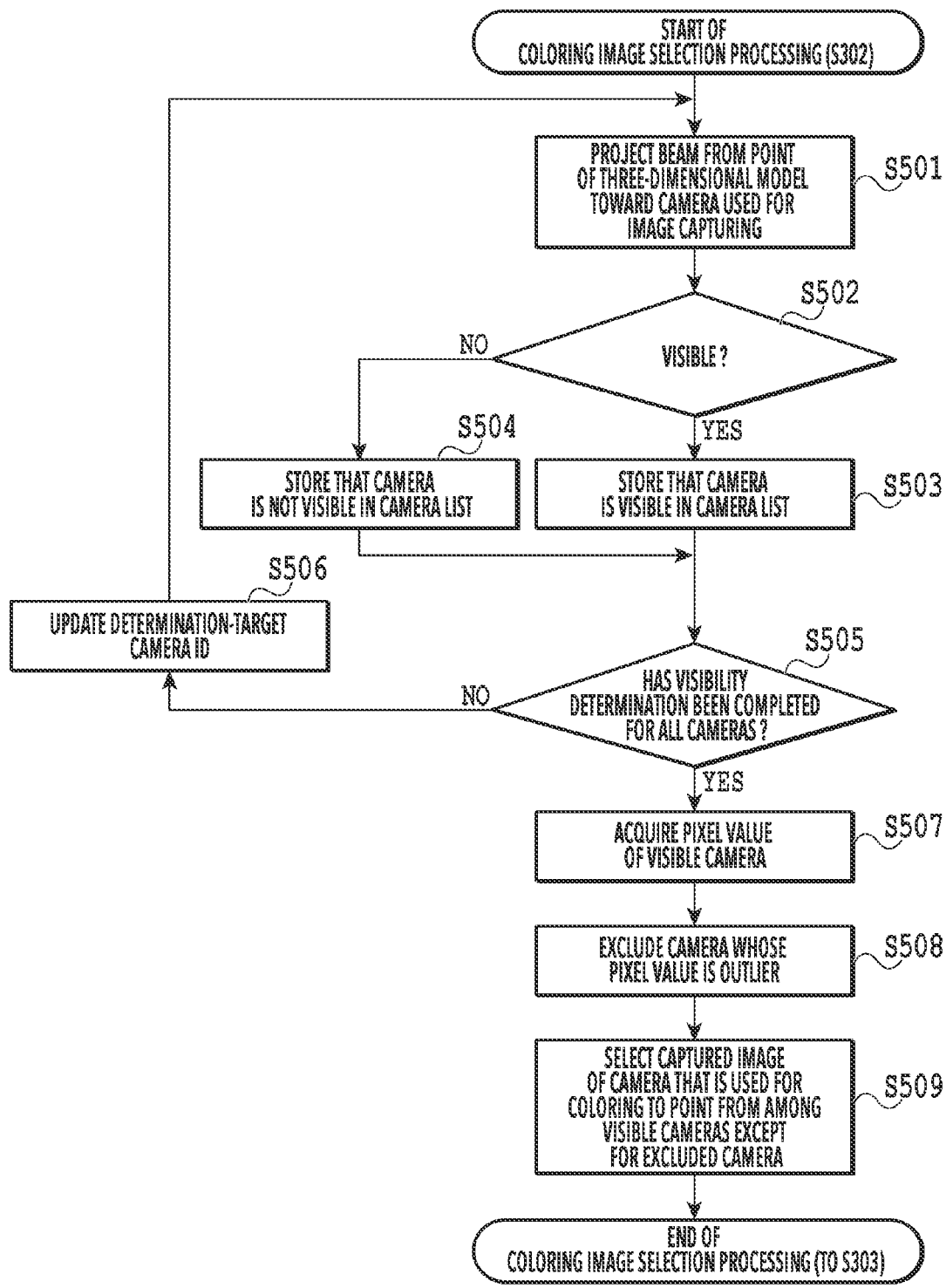
FIG. 5 is a flowchart of the coloring image selection processing in the first embodiment.
Figure 6:
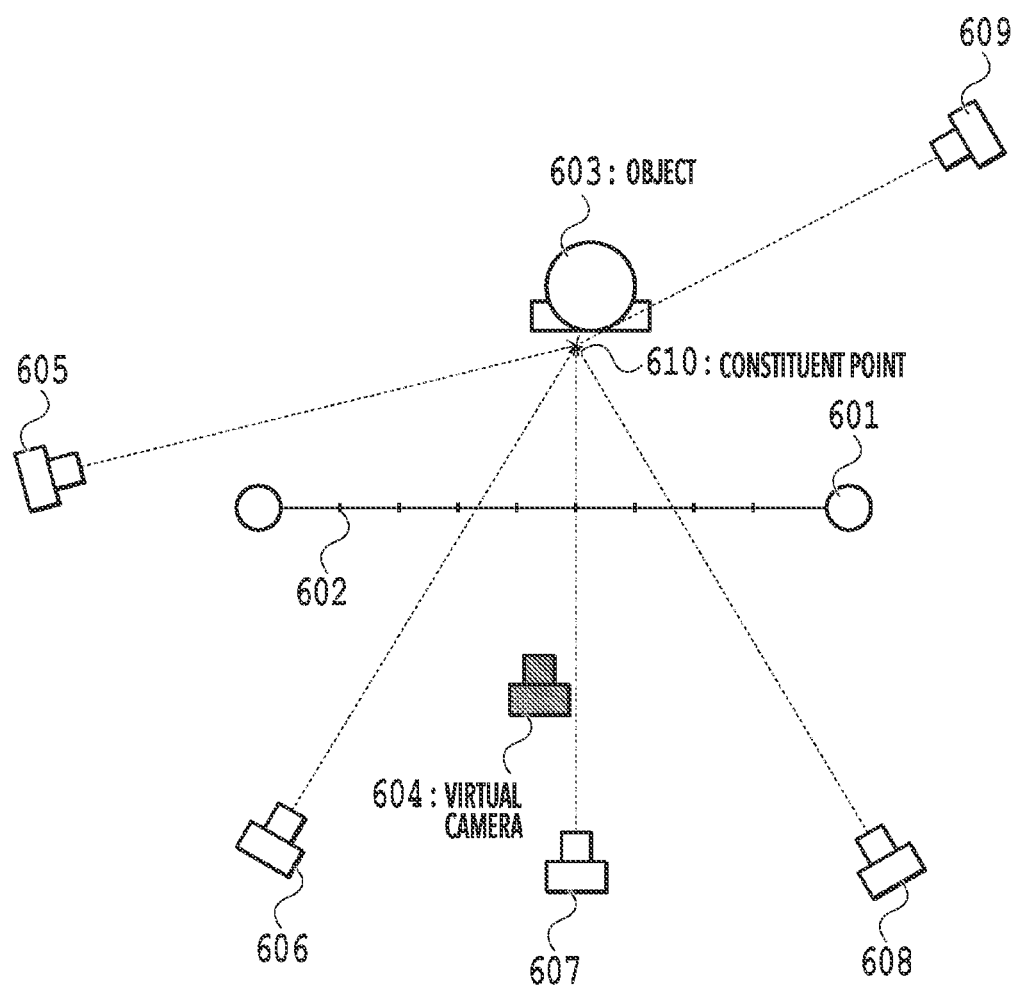
FIG. 6 is a schematic diagram supplementally explaining the coloring image selection processing in the first embodiment.

In the following, the coloring image selection processing in the present embodiment is explained by using FIG. 5 and FIG. 6. FIG. 6 is a schematic diagram showing a positional relationship between an object and cameras like FIG. 4B. In FIG. 6, symbol 601 indicates a goal frame, symbol 602 indicates a goal net, and symbol 603 indicates a target object of an image capturing target. Further, symbol 604 indicates a position that is specified in a case where a virtual viewpoint image is generated, that is, a camera (so-called virtual camera) assumed to be installed at the position and symbols 605 to 609 indicate cameras that are used actually. For the sake of explanation, FIG. 6 is a diagram in which the portion of the crossbar of the goal frame 601 is omitted. In the following, processing to perform coloring to a constituent point 610, which is one of points configuring a three-dimensional model of the object (player) 603, is explained by using FIG. 5.

At S501, a beam is virtually projected onto a determination-target camera from the constituent point 610 of the three-dimensional model.

At S502, based on results of the projection at S501, whether the constituent point is visible from the installation position of the determination-target camera, in other words, whether this camera captures the constituent point as an image is determined. In a case where the determination results at S502 are affirmative, the processing advances to S503. On the other hand, in a case where the determination results at S502 are negative, the processing advances to S504.

In a case of YES at S502, at S503, information indicating that the constituent point is visible from the position of the determination-target camera is stored. In the present embodiment, information indicating whether or not the constituent point is visible is described in a list shown in FIG. 7 in association with the camera ID.

On the other hand, in a case of NO at 502, at 504, information indicating that the constituent point is not visible from the position of the determination-target camera is stored. In this manner, at S503 or S504, visibility determination information indicating whether or not the constituent point is visible for each camera actually used for image capturing is stored.

At S505, whether the visibility determination at S502 has been performed for all the cameras used for image capturing is determined. In a case where the determination results at S505 are negative, the processing advances to S506 and after updating the camera ID of the determination target, that is, after changing the determination-target camera, the processing returns to S501. On the other hand, in a case where the determination results at S505 are affirmative, the processing advances to S507.

Here, the processing at S501 to S506 is explained supplementally by using FIG. 6. In the case shown in FIG. 6, among the cameras 605 to 609, only the camera 609 is not determined to be visible because the constituent point 610 is shielded by another point configuring the three-dimensional model of the object (player) 603 (NO at 502). It is assumed that the goal net 602 is not defined as an object that shields (occludes) the constituent point 610 and the camera 607 is determined to be visible. Further, the information indicating whether or not visible for each camera, which is acquired as the results of the determination at 502, is stored by using a list 701 as shown in FIG. 7 at S503 or S504. In the list 701, a column that stores the information indicating the results of the visibility determination is provided and in a case of being visible, "1" is stored for each camera and on the other hand, in a case of being invisible, "0" is stored.

After S505, the pixel value of the pixel corresponding to the constituent point included in the captured image of the camera determined to be visible is acquired at S507. Then, the acquired pixel value is described in the list 701 shown in FIG. 7. Part or all of the pixel values acquired at this step are used for coloring to the constituent point in subsequent processing.

At S508, whether or not there is an outlier among the acquired pixel values (specifically, RGB values) is determined. Then, in a case where there is an outlier, the camera corresponding to the outlier is excluded from the selection candidates. For example, in the case shown in FIG. 6, among the cameras 605 to 608, only the camera 607 is reached by the beam from the constituent point 610 through the object (goal net) 602, and therefore, the pixel value of the camera 607 is an outlier (see FIG. 7). Consequently, the camera 607 is excluded from the selection candidates. As the method of determining whether or not the pixel value is an outlier, a method or the like is considered, in which an average value of the pixel value corresponding to the pixel of interest is calculated for the captured images of a plurality of cameras and the pixel value whose difference from the calculated average value is larger than or equal to a predetermined threshold value is handled as an outlier, but the method is not limited to this.

At S509, from among the visible cameras except for the camera excluded at S507, the captured image captured by the camera that is used for coloring to the constituent point 610 is selected. As the selection method at this time, for example, it is possible to adopt the method of selecting the camera whose distance from the virtual camera 604 is the shortest. In the case shown in FIG. 6, the camera whose distance from the virtual camera 604 is the shortest is the camera 606 among the cameras except for the excluded camera 607. Consequently, as the camera that is used for coloring, the camera 606 is selected. The selection method at this step is not limited to this. For example, it may also be possible to select the camera whose image capturing direction is the most similar to that of the virtual camera 604 among the cameras not excluded. Further, it may also be possible to select a plurality of cameras and perform coloring processing by using the color calculated based on a plurality of pixel values corresponding to the selected plurality of cameras. The above is the contents of the coloring image selection processing in the present embodiment.

About Effects of the Present Embodiment

By the present embodiment, it is made possible to perform coloring after excluding the camera that colors a three-dimensional model in a color, such as the color of the object (goal net) 602, in which the three-dimensional model should not originally be colored, at the time of performing coloring to the constituent point 610 in a case, for example, as shown in FIG. 6. Consequently, it is made possible to generate a virtual viewpoint image of a higher quality. In the present embodiment, the (invisible) camera not capable of capturing the constituent point 610 is excluded based on the object positional information and the like and further, the camera whose pixel value is an outlier is excluded from the cameras except for the invisible camera By selecting the camera that is used for coloring from among the candidate cameras that remains in this manner, the possibility that the camera that captures the constituent point 610 correctly is selected becomes strong. However, this is not limited and it may also be possible not to perform one of the exclusion of the invisible camera and the exclusion of the camera whose pixel value is an outlier. According to this method, it is possible to reduce the processing relating to the determination for exclusion.

Second Embodiment

In the present embodiment, at the time of selecting a captured image that is used for coloring to a constituent point of a three-dimensional model, mask information that is set in advance is used. In the following, points different from the already-described embodiment are explained mainly and explanation of the same contents as those of the already-described embodiment is omitted appropriately.
<About Configuration of Image Generation Apparatus>

In the following, the software configuration of the image generation apparatus 122 in the present embodiment is explained by using FIG. 8. The hardware configuration of the image generation apparatus 122 in the present embodiment is the same as that of the first embodiment.

Figure 8:
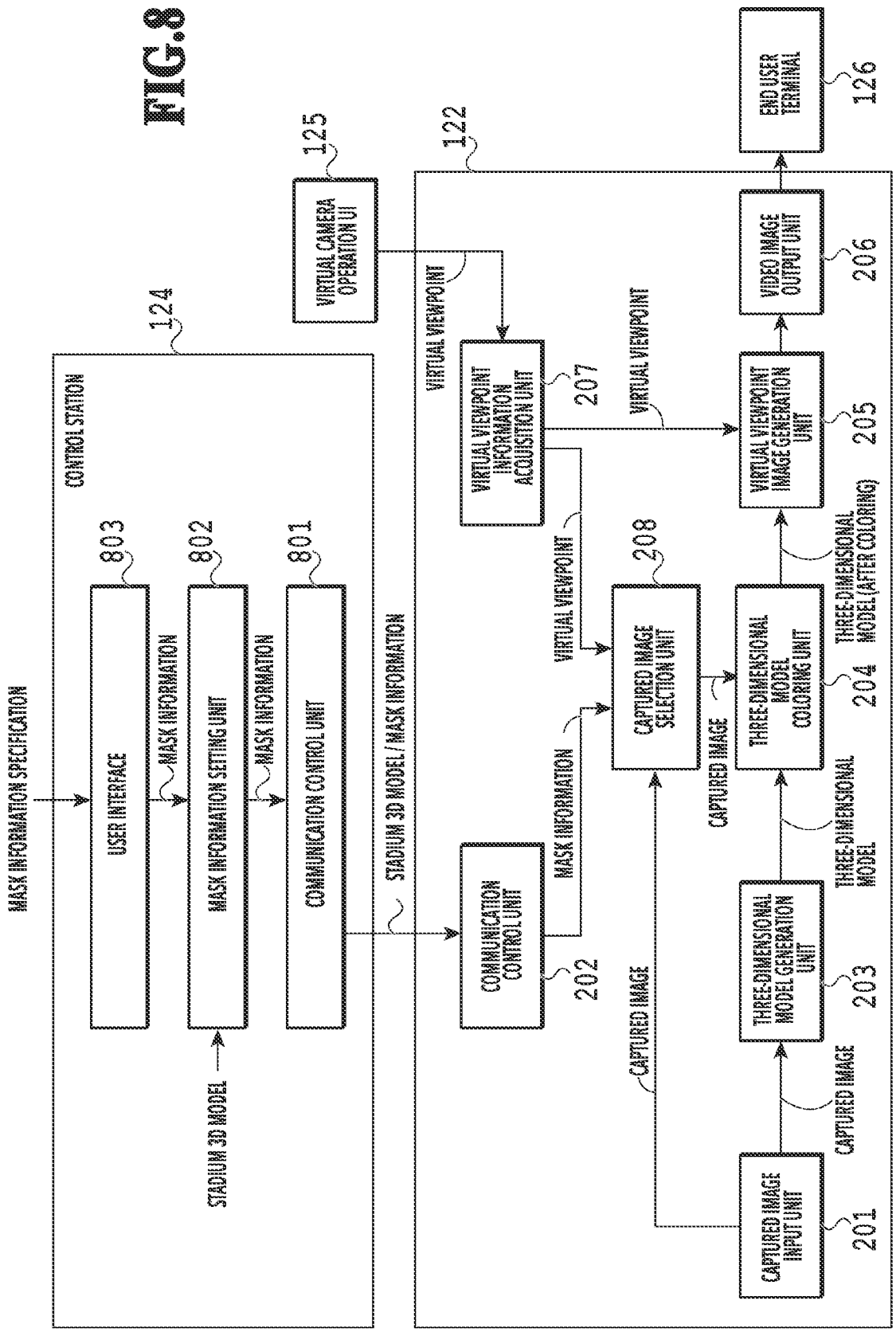
FIG. 8 is a function block diagram of an image generation apparatus in a second embodiment and a third embodiment.

A communication control unit 801 in FIG. 8 is a function block (module) that controls communication in the control station 124 and performs communication processing between the control station 124 and the image generation apparatus 122. The control station 124 transmits mask information, in addition to data indicating the three-dimensional shape of a stadium (three-dimensional model data) and information and the like relating to the installation of each camera via the communication control unit 801.

A mask information setting unit 802 performs processing to set information indicating whether or not an area that can be made use of for coloring within a captured image for each camera of a plurality of cameras used for image capturing. Here, the mask information is explained by using FIG. 9A and FIG. 9B.

Figures 9A, 9B:
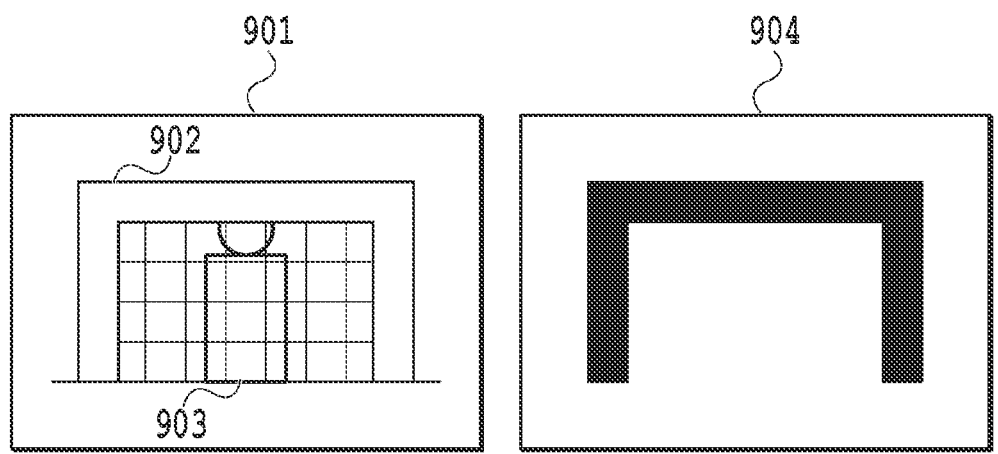
FIG. 9A and FIG. 9B are each a diagram explaining mask information in the second embodiment.

The mask information in the present embodiment is information relating to an occlusion area within a captured image and information indicating whether the area may be used for coloring and the like. The occlusion area is an area having a possibility that a target object is shielded (occluded) by another object (referred to as shielding object) existing on a line connecting the target object and a camera. For example, the mask information is an image for explicitly indicating that coloring should not be performed by using the pixel value of the area at the time of performing coloring processing for the three-dimensional model representing the target object that is hidden behind the shielding object, such as a goal frame. FIG. 9A shows a captured image 901 captured by a certain camera. Symbol 902 within the captured image 901 indicates a goal frame and by the goal frame 902, a part of an object (player) 903 is shielded. In a case where coloring is performed by using the captured image 901 to the three-dimensional model of the object (player) 903 existing across the shielded area, the portion of the head in the three-dimensional model of the object (player) 903 is colored in the color of the goal frame 902. In order to avoid the erroneous coloring such as this, in the present embodiment, a mask image 904 shown in FIG. 9B is used. The black area within the mask image 904 indicates the area of the goal frame and by explicitly indicating the area that should not be used for coloring in this manner, it is possible to avoid the pixel value in the area from being used at the time of coloring.

A user interface 803 is an interface for a user to give various instructions to the control station 124. A user sets mask information via the user interface 803.
<About Coloring Image Selection Processing>

Figure 10:
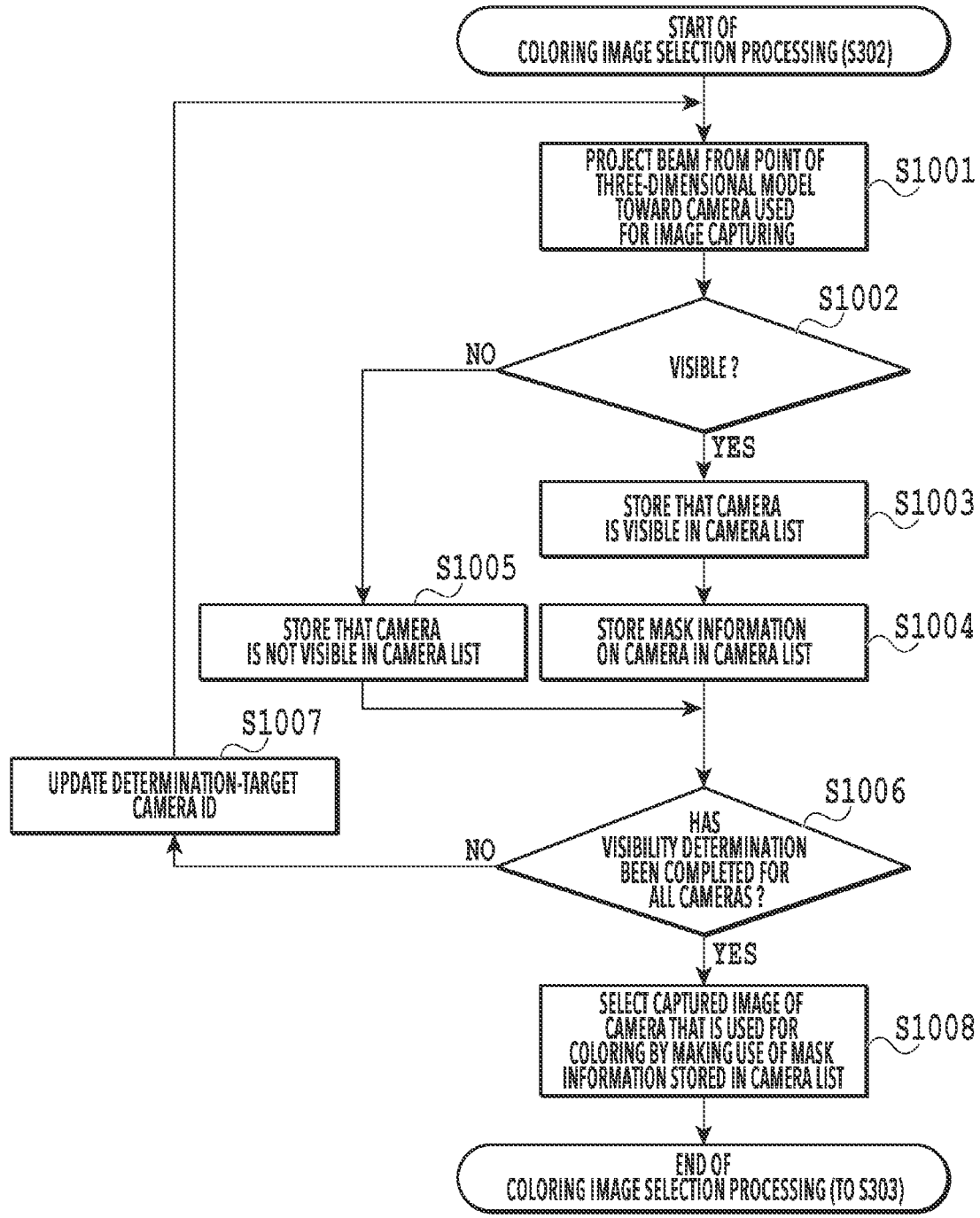
FIG. 10 is a flowchart of coloring image selection processing in the second embodiment and the third embodiment.

In the following, coloring image selection processing in the present embodiment is explained by using FIG. 10. The entire flow of the processing to generate a virtual viewpoint image in the present embodiment is the same as that in the first embodiment (see FIG. 3), and therefore, explanation is omitted. The coloring image selection processing shown in FIG. 10 is performed at S302 in FIG. 3.

At S1001, a beam is projected onto the determination-target camera from the constituent point of the three-dimensional model. The processing at S1001 is the same as the processing at S501 in FIG. 5.

At S1002, based on the projection results at S1001, whether the constituent point is visible from the position of the determination-target camera is determined. The processing at S1002 is the same as the processing at S502 in FIG. 5. In a case where the determination results at S1002 are affirmative, the processing advances to S1003. On the other hand, in a case where the determination results at S1002 are negative, the processing advances to S1005.

First, a case of YES at S1002 is explained. In this case, at S1003, information indicating that the constituent point is visible from the position of the determination-target camera is stored and at S1004, mask information for the captured image of the determination-target camera is stored. At S1004, by determining whether the pixel corresponding to the constituent point belongs to the mask area (indicating that the area is an occlusion area) in the captured image and so on, the mask information to be stored is generated.

Figures 13A, 13B:
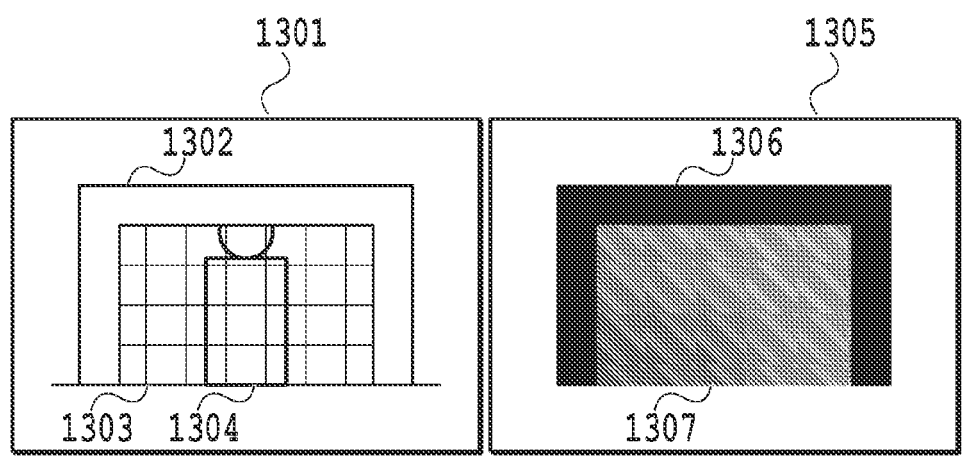
FIG. 13A and FIG. 13B are each a diagram explaining mask information in the second embodiment.

Here, the mask information that is used in the present embodiment is explained in detail by using FIG. 13A and FIG. 13B. In a captured image 1301 shown in FIG. 13A, an object (player) 1304 is captured, a part of which is shielded by a shielding object (goal frame) 1302 and a shielding object (goal net) 1303. In the present embodiment, as the mask information for the captured image 1301, mask information 1305 shown in FIG. 13B is introduced. In the mask information 1305, in addition to a mask area 1306 by an object that completely shields, such as the goal frame, a mask area 1307 by an object that shields only a partial area, such as the goal net, is defined anew. The mask area 1307 is not an area whose all pixels in the entire area cannot be used for coloring, but is an area whose pixel can be used for coloring depending on a virtual viewpoint image to be generated. By setting the mask area such as this, the mask area that cannot be used for coloring completely and the mask area other than that are made clear and based on the information, a captured image that is used is selected. The specific contents of the mask information may be specified by a user. The mask information setting unit 802 performs processing to set mask information based on the contents specified by a user via the user interface 803.

Following the above, a case of NO at S1002 is explained. In this case, at S1005, information indicating that the constituent point is not visible from the position of the determination-target camera is stored.

After S1004 or S1005, at S1006, whether the visibility determination at S1002 has been performed for all the cameras used for image capturing is determined. In a case where the determination results at S1006 are negative, the processing advances to S1007 and after updating the camera ID of the determination target, that is, after changing the determination-target camera, the processing returns to S1001. On the other hand, in a case where the determination results at S1006 are affirmative, the processing advances to S1008.

At S1008, based on the mask information stored at S1004, the captured image of the camera that is used for coloring is selected.

Figure 11:
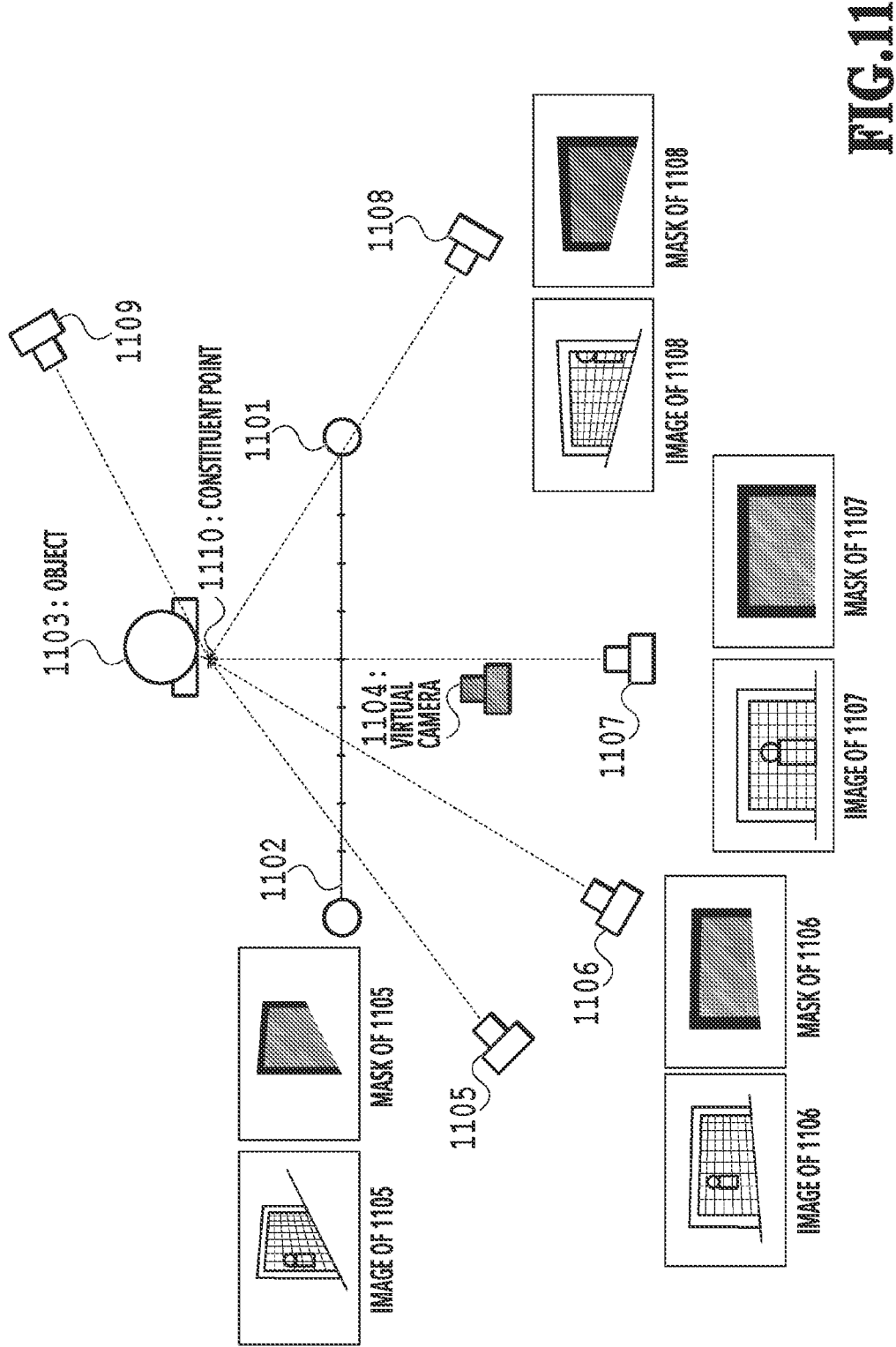
FIG. 11 is a diagram explaining a positional relationship between cameras and an object in the second embodiment and the third embodiment.

Here, the coloring image selection processing in the present embodiment is explained supplementally by using FIG. 11. FIG. 11 is a schematic diagram showing a case where a coloring image is selected at the time of generating a virtual viewpoint image that captures a player from behind a goal net. In FIG. 11, symbol 1101 indicates a goal frame, symbol 1102 indicates a goal net, and symbol 1103 indicates an object (player). FIG. 11 shows a case where one image is selected by using mask information from among images captured by cameras 1105 to 1109, respectively, in coloring processing for a constituent point 1110, which is one of constituent points corresponding to the object 1103.

FIG. 12 is a diagram showing an example of a list that is created in the coloring image selection processing (FIG. 10) in the present embodiment. A camera list 1201 is a list that stores information indicating whether or not visible, mask information, and pixel values for each camera. As described previously, the information indicating whether or not visible is stored in the camera list 1201 at S1003 or S1005. Further, the mask information is stored in the cameral list 1201 at S1004. The mask information in the present embodiment indicates whether or not mask exists and the mask type in a case of the mask area. Here, as the value that the mask information can take, a value indicating that the area is not a mask area (there is no mask) is defined as "0". Further, the value indicating that the area is a mask area by an object that shields completely, such as the goal frame, is defined as "1" and the value indicating that the area is an area in which an area that is shielded by an object, such as the goal net, and an area that is not shielded exist in a mixed manner is defined as "2".

The selection processing at S1007 in FIG. 10 is performed by using the camera list 1201 shown in FIG. 12. Among the cameras 1105 to 1109 registered in the camera list 1201, it is made clear from the mask information that the camera 1109 is invisible and the camera 1108 is completely shielded by the goal frame, and therefore, these cameras are excluded from the selection candidates. Then, by performing the outlier determination for the remaining cameras (that is, cameras whose value of mask information is "2"), it is possible to exclude the camera 1107 from the selection candidates. In a case where there is a camera whose value of mask information is "0", the camera is the selection candidate without performing the outlier determination. The captured image of the selected camera (for example, the camera 1106 closest to the virtual camera 1104) among the finally remaining cameras is selected as the coloring image. In the present embodiment, the example of the case is described where the mask area that is the target of the outlier determination corresponds to the goal net, but the object corresponding to the mask area is not limited to this. For example, in a case where the image capturing target is the track and field events, it may also be possible to set the mask area corresponding to the net of the hammer throw or the sandbox court of the broad jump.

About Effects of the Present Embodiment

According to the present embodiment, the outlier determination-target cameras are narrowed based on the mask information, and therefore, it is possible to select a coloring image from among a plurality of captured images in a time shorter than that of the first embodiment.

Third Embodiment

In the present embodiment, as in the second embodiment, at the time of selecting a captured image used for coloring to a constituent point of a three-dimensional model, mask information set in advance is made use of. However, in the present embodiment, by setting color information also as mask information, in addition to the information on the mask type explained in the second embodiment, and making use of the set mask information, it is made possible to select a captured image at a higher speed. The software configuration and the flow of the coloring image selection processing in the present embodiment are the same as those of the second embodiment (see FIG. 8, FIG. 10).

Figures 14A, 14B:
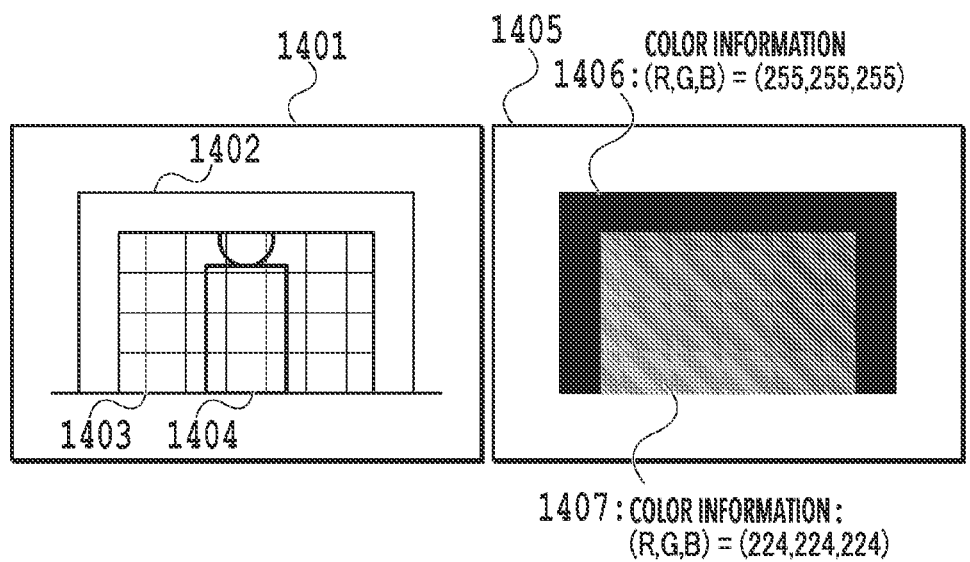
FIG. 14A and FIG. 14B are each a diagram explaining mask information in the third embodiment.

The mask information that is used in the present embodiment is explained by using FIG. 14A and FIG. 14B. In a captured image 1401 shown in FIG. 14A, an object (player) 1404 is captured, a part of which is shielded by a shielding object (goal frame) 1402 and a shielding object (goal net) 1403. In the present embodiment, as the mask information for the captured image 1401, mask information 1405 shown in FIG. 14B is introduced. As shown in FIG. 14B, in the present embodiment also, as in the second embodiment, in addition to a mask area 1406 by an object that shields completely, such as the goal frame, a mask area 1407 by an object that shields only a partial area, such as the goal net, is defined. Further, for each mask area, color information is set. In the example in FIG. 14B, a user sets (255, 255, 255)

as color information (specifically. RGB values) on the mask area 1406 and specifies (224, 224, 224) as color information on the mask area 1407. These pieces of color information are values in accordance with the colors of the objects (goal frame and goal net) located in the mask area. Specific contents of the mask information may be specified by a user or may be set automatically. The mask information setting unit 802 performs processing to set mask information based on the contents specified by a user via the user interface 803.

FIG. 15 is a diagram showing an example of a list that is created in the coloring image selection processing (FIG. 10) in the present embodiment. A list 1501 is a list that stores information indicating whether or not visible, mask information including information on the type and color, and pixel values for each camera. Here, explanation is given by taking a case as an example where the positional relationship between cameras and an object is the same as in the second embodiment (see FIG. 11).

Based on the visibility determination results and the mask information, it is possible to derive that the cameras 1105 to 1107 are the candidate cameras that are used for coloring. That is, the camera 1109 for which the constituent point 1110 is shielded by the object 1103 and the camera 1108 whose mask information is "1" and for which the goal frame and the constituent point 1110 overlap are excluded from the selection candidates of coloring. Next, by comparing the color information on the mask and the pixel values of the area within the captured image, it is possible to determine whether the camera is shielded by some object existing on the straight line connecting the constituent point and the camera. In the example in FIG. 15, the color values of the mask area and the pixel values of the captured image of the camera 1107 are close to each other, and therefore, it is made clear that the camera 1107 is the camera shielded by an object (specifically, the goal net) and the camera 1107 is excluded from the selection candidates of coloring. By comparing the color values of the mask area and the pixel values of the captured image in this manner, it is possible to determine whether the camera is shielded. As the determination method, a method or the like is considered in which it is regarded that the camera is shielded in a case where a difference between the pixel value and the color value of the mask area is within a predetermined threshold value, but the determination method is not limited to this. By comparing the color information (RGB values) on the mask and the pixel values in this manner, it is no longer necessary to perform the outlier determination by comparing the pixel values among a plurality of cameras and it is made possible to immediately determine whether or not the camera is shielded. Consequently, for example in a case where a method of determining the camera in order from the camera close to the position of the virtual camera is adopted, on a condition that it is possible to determine that the determination-target camera is not shielded by a shielding object, the search for the camera that is used for coloring may be completed in that stage. In the present embodiment, the camera 1108 whose mask information is "1" and for which the goal frame and the constituent point 1110 overlap is excluded first, but this is not limited and it may also be possible to perform the exclusion determination by comparing the pixel values of the captured image and the color values (255, 255, 255) of the mask information also for the camera 1108. Further, the format of the color information on the mask is not limited to the above and for example, the format may be luminance information and one mask type may correspond to a plurality of pieces of color information.

<About Effects of the Present Embodiment>

According to the present embodiment, it is possible to select a coloring image from among a plurality of captured images in a time shorter than that of the second embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

By the present disclosure, it is made possible to suppress a reduction in quality of a virtual viewpoint image.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
   one or more memories configured to store instructions; and
   one or more processors configured to execute the instructions to:
      specify an image in which a specific position in a target object is not occluded by another object from among a plurality of images obtained by a plurality of imaging apparatuses based on a value determined using pixel values of the plurality of images, the pixel values being values of a pixel corresponding to the specific position in each of the plurality of images;
      determine, based on the specified image, a value of a pixel corresponding to the specific position in a virtual viewpoint image to be generated based on the plurality of images;
      generate the virtual viewpoint image including the target object based on the determined value of the pixel;
      calculate an average value of pixel values corresponding to the specific position based on the plurality of images;

determine whether a pixel value is an outlier by determining whether a difference between the pixel value corresponding to the specific position and the calculated average value is larger than or equal to a predetermined threshold value for each of the plurality of images; and exclude an image whose pixel value corresponding to the specific position is the outlier.

2. The image processing apparatus according to claim 1, wherein the one or more processors is further configured to execute the instructions to determine visibility determination information indicating whether or not the specific position is visible.

3. The image processing apparatus according to claim 2, wherein the visibility determination information is determined based on whether the specific position is visible from an installation position for each of the plurality of imaging apparatuses.

4. The image processing apparatus according to claim 2, wherein
the image is specified based on the visibility determination information.

5. The image processing apparatus according to claim 1, wherein the one or more processors is further configured to execute the instructions to set mask information specifying an occlusion area for each of the plurality of images, and
wherein the image is specified based on the mask information.

6. The image processing apparatus according to claim 5, wherein
the mask information includes information indicating whether or not a mask exists and indicating a mask type in a case where the mask exists.

7. The image processing apparatus according to claim 6, wherein
the mask information further includes information relating a color corresponding to a mask area.

8. The image processing apparatus according to claim 7, wherein
the image is specified based on results of comparing a pixel value corresponding to the specific position and a value of the color corresponding to the mask area for each of the plurality of images.

9. The image processing apparatus according to claim 5, wherein the one or more processors is further configured to execute the instructions to create a list storing the mask information for each of the plurality of images, and
wherein the image is specified based on the list.

10. The image processing apparatus according to claim 9, wherein
the list is created by determining whether a pixel corresponding to the specific position belongs to a mask area indicating the occlusion area for each of the plurality of images.

11. The image processing apparatus according to claim 1, wherein the one or more processors is further configured to execute the instructions to:
specify an imaging apparatus in which no other object exists on a line connecting the imaging apparatuses and the specific position in the target object from the plurality of imaging apparatuses.

12. The image processing apparatus according to claim 11, wherein the specified imaging apparatus is an imaging apparatus specified by projecting a beam onto an imaging apparatus from the specific position.

13. The image processing apparatus according to claim 1, wherein the specific position is one of a plurality of constituent points for configuring a three-dimensional model.

14. A control method of an image processing apparatus, the control method comprising:
specifying an image in which a specific position in a target object is not occluded by another object from among a plurality of images obtained by a plurality of imaging apparatuses based on a value determined using pixel values of the plurality of images, the pixel values being values of a pixel corresponding to the specific position in each of the plurality of images;

determining, based on the specified image, a value of a pixel corresponding to the specific position in a virtual viewpoint image to be generated based on the plurality of images;

generating the virtual viewpoint image including the target object based on the determined value of the pixel;

calculating an average value of pixel values corresponding to the specific position based on the plurality of images;

determining whether a pixel value is an outlier by determining whether a difference between the pixel value corresponding to the specific position and the calculated average value is larger than or equal to a predetermined threshold value for each of the plurality of images; and excluding an image whose pixel value corresponding to the specific position is the outlier.

15. A non-transitory computer readable storage medium storing a program for causing a computer to execute a control method of an image processing apparatus, the control method comprising:
specifying an image in which a specific position in a target object is not occluded by another object from among a plurality of images obtained by a plurality of imaging apparatuses based on a value determined using pixel values of the plurality of images, the pixel values being values of a pixel corresponding to the specific position in each of the plurality of images;

determining, based on the specified image, a value of a pixel corresponding to the specific position in a virtual viewpoint image to be generated based on the plurality of images;

generating the virtual viewpoint image including the target object based on the determined value of the pixel;

calculating an average value of pixel values corresponding to the specific position based on the plurality of images;

determining whether a pixel value is an outlier by determining whether a difference between the pixel value corresponding to the specific position and the calculated average value is larger than or equal to a predetermined threshold value for each of the plurality of images; and excluding an image whose pixel value corresponding to the specific position is the outlier.

* * * * *